US012180006B2

(12) United States Patent
De Smedt et al.

(10) Patent No.: US 12,180,006 B2
(45) Date of Patent: Dec. 31, 2024

(54) LOADING AND UNLOADING BREAK BULK CARGO SHIPS

(71) Applicant: Belgo-Iberian Maritime NV, Antwerp (BE)

(72) Inventors: Jeroen De Smedt, Knesselare (BE); Philippe Oyen, Kapellen (BE)

(73) Assignee: BELGO-IBERIAN MARITIME NV, Antwerp (BE)

( * ) Notice: Subject to any disclaimer, the term of this patent is extended or adjusted under 35 U.S.C. 154(b) by 330 days.

(21) Appl. No.: 17/615,640

(22) PCT Filed: Jun. 3, 2020

(86) PCT No.: PCT/IB2020/055220
§ 371 (c)(1),
(2) Date: Dec. 1, 2021

(87) PCT Pub. No.: WO2020/245733
PCT Pub. Date: Dec. 10, 2020

(65) Prior Publication Data
US 2022/0306388 A1 Sep. 29, 2022

(30) Foreign Application Priority Data
Jun. 3, 2019 (BE) .................... 2019/5363

(51) Int. Cl.
*B63B 25/02* (2006.01)
*B63B 25/24* (2006.01)
*B65G 1/14* (2006.01)

(52) U.S. Cl.
CPC ............... *B65G 1/14* (2013.01); *B63B 25/02* (2013.01); *B63B 25/24* (2013.01)

(58) Field of Classification Search
CPC ............ B65G 1/14; B63B 25/02; B63B 25/24
(Continued)

(56) References Cited

U.S. PATENT DOCUMENTS 3,124,209 A * 3/1964 Flipse .................... B65G 7/06
414/137.1
3,907,147 A * 9/1975 Goobeck .................. B65D 7/24
414/137.1
(Continued)

FOREIGN PATENT DOCUMENTS

DE 202005016346 U1 2/2007
DE 202007007209 U1 8/2007
(Continued)

OTHER PUBLICATIONS

Engineered Materials Handbook; "Elastomers", Tuszynski, p. 282-286 (Year: 1995).*
(Continued)

*Primary Examiner* — Lynn E Schwenning
(74) *Attorney, Agent, or Firm* — KDW Firm PLLC

(57) ABSTRACT

A method for loading break bulk cargo ships includes stacking one or more cargo layers in a hold of the break bulk cargo ship, wherein the stacking includes placing a bottom layer for each cargo layer, where the bottom layer is formed by one or more mats manufactured from an elastically deformable material, such that the mats form strips which extend adjacently of each other in elongate manner. The stacking further includes placing at least one layer of goods on the bottom layer, where the at least one layer of goods is formed by one or more layers of break bulk goods.

16 Claims, 6 Drawing Sheets

(58) Field of Classification Search
USPC .............................................. 114/72, 73, 75
See application file for complete search history.

(56) References Cited

U.S. PATENT DOCUMENTS

2012/0269595 A1* 10/2012 Fox ......................... B63B 25/24
                                                            410/121
2016/0264038 A1    9/2016 Parkes et al.

FOREIGN PATENT DOCUMENTS

DE      202009010240 U1    10/2009
EP            1464538 A1   10/2004
EP            1854663 A1   11/2007

OTHER PUBLICATIONS

RubberGreen: "Load securing", Apr. 20, 2014, URL: https://www.rubbergreen.eu/nl/product/load-securing.
Southern Bracings Systems: "Rubber Matting", Feb. 1, 2019, URL: https://www.southernbracing.com/rubber-matting.
International Search Report and Written Opinion for the International Patent Application No. PCT/IB2020/055220, mailed Oct. 8, 2020, 11 pages.
Jurong Port, "Best practice guidelines for stowage and securing of steel cargoes," Nov. 2, 2018, 108 pages.

* cited by examiner

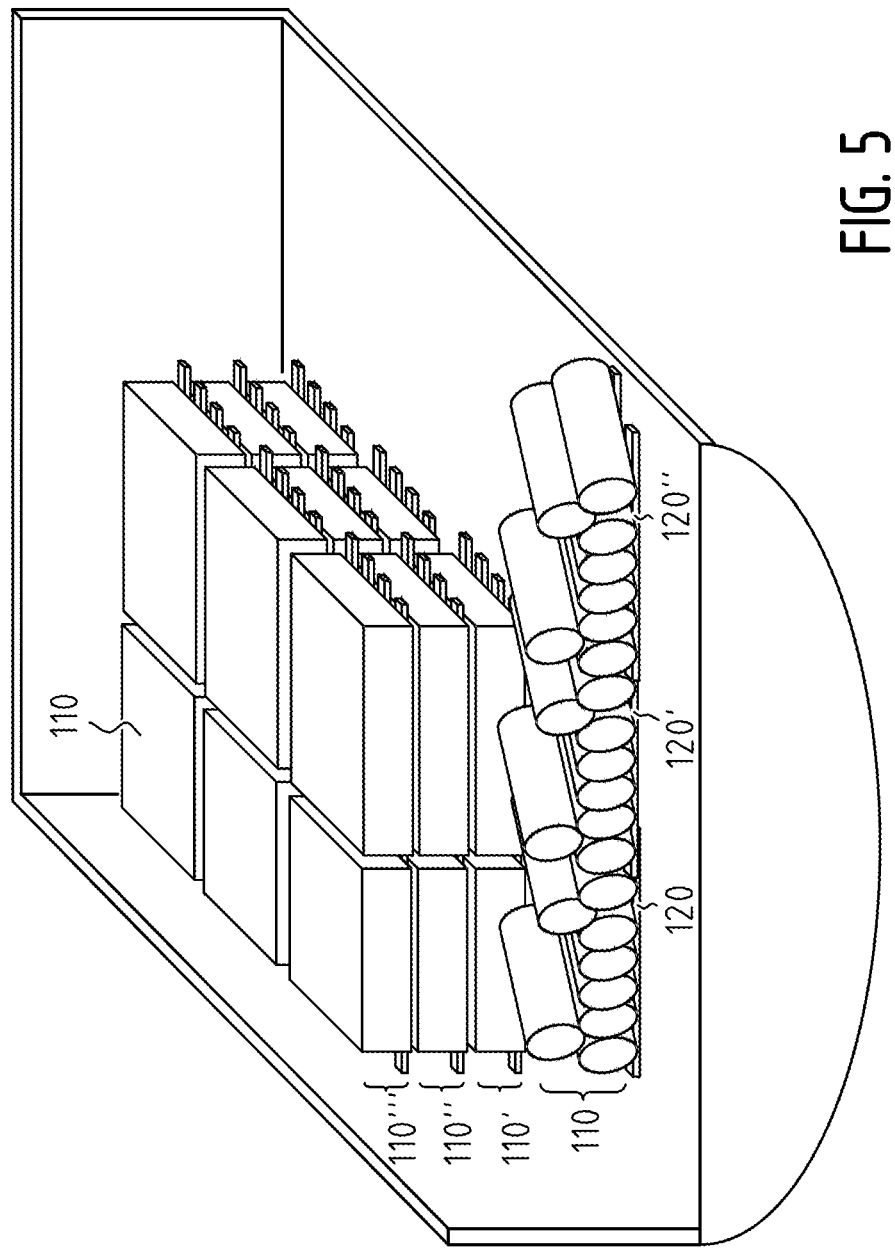

LOADING AND UNLOADING BREAK BULK CARGO SHIPS

This application is a national stage filing under 35 U.S.C. 371 of pending International Application No. PCT/IB2020/055220, filed Jun. 3, 2020, which claims priority to Belgian Patent Application No. BE2019/5363, filed Jun. 3, 2019, the entirety of which applications are incorporated by reference herein.

FIELD OF THE INVENTION

The present invention relates to the field of loading and unloading break bulk cargo ships. The present invention further relates to mats for use in loading and unloading break bulk cargo ships.

BACKGROUND

The transport of goods is typically sub-divided into different categories. A first category comprises transport of container goods, for instance garments, using standardised TEU containers. The container goods can be packaged and stored in a TEU container. The containers can be transported by road, over water and by rail, without the goods themselves being loaded and unloaded. A second category comprises transport of so-called bulk materials or bulk goods, for instance grain. These bulk goods are goods which are not packaged individually or by measure. Such goods are deposited in bulk in the cargo hold of a vessel, truck or freight car. Bulk materials or bulk goods can comprise solid, liquid and gaseous goods. A third category comprises transport of break bulk cargo or break bulk goods. Break bulk goods are supplied per unit. Break bulk goods are typically transported in cases, crates, drums or bales, or even as separate individual units. Examples of break bulk goods are steel rolls, steel girders, cars and so on. Vessels, and particularly the holds thereof, vary in size. The shape of the hold further also depends on the vessel. The break bulk goods also vary in respect of shape and weight. Loading of the vessels is typically accompanied by stacking of the break bulk goods using wooden beams. Because both the vessels and the break bulk goods for transporting are variable, the wooden beams are sawn to size. The wooden beams are then placed in the hold, and the break bulk goods are secured to the wooden beams. Because the vessels and the goods are variable, loading and unloading of break bulk goods in vessels is labour-intensive. A further drawback is that large quantities of wood are necessary for the known loading process, wherein the wood is destroyed or rendered unusable during unloading of the vessel. The requirements for the wood quality are further also high due to the international character of the transport and the local flora and fauna at the destination, making the break bulk cargo transport expensive.

SUMMARY OF THE INVENTION

Embodiments of the invention have the object of obtaining an improved method for loading and unloading break bulk cargo.

According to a first aspect of the invention, a method is provided for loading break bulk cargo ships, wherein the method comprises of stacking one or more cargo layers in a hold of the break bulk cargo ship, wherein the stacking comprises the following steps of:

placing a bottom layer for each cargo layer, wherein the bottom layer is formed by one or more mats which are manufactured from an elastically deformable material, such that the mats form strips which extend adjacently of each other in elongate manner;

placing at least one layer of goods on the bottom layer, wherein the at least one layer of goods is formed by one or more layers of break bulk goods.

The mats from an elastically deformable material can be placed in simple and efficient manner in a bottom of the hold or on layers of goods. The method thus provides an improved manner of loading break bulk goods. An additional advantage of the elastically deformable mats is that they can be recovered and reused when the vessel is unloaded. Yet another advantage is based on the insight that the use of mats from an elastically deformable material prevents the spread of non-native flora and fauna. Compared to the existing process in which wood is used, embodiments of the invention have the advantage that no or less wood is necessary and that the mats are reusable, this in contrast to wood. When wood is used, non-native plants and animal species from the location of departure of the wood also travel along to the final destination of the freight. These plant and animal species can do irreparable damage to the native flora and fauna of the destination. The use of mats from an elastomer material can considerably limit the spread of flora and fauna.

According to a possible embodiment, the placing comprises of supplying the one or more mats in rolled-up state, and unrolling the mats. An advantage hereof is based on the insight that loading of break bulk goods is a labour-intensive process which is carried out manually by dockworkers. Because the mats can be unrolled and rolled up, the mats can be easily handled manually.

According to a possible embodiment, the mats comprise a layer manufactured from a natural or synthetic polymer material. The mats are preferably substantially manufactured from a polymer material.

According to a possible embodiment, the polymer material comprises a rubber. The mats are preferably substantially manufactured from rubber. The rubber preferably comprises a natural rubber. In this way the method provides mats which are manufactured from a renewable material.

According to a possible embodiment, the mats comprise a plurality of layers, comprising at least one polymer layer which is formed from the elastically deformable material and at least one fibre cloth layer which is attached to the at least one polymer layer. A mat more preferably comprises at least two polymer layers between which is provided a fibre cloth layer which is adhered to the at least two polymer layers. A fibre cloth can have a woven structure which functions as reinforcement in the mat. The mats are thus reinforced, this improving their lifespan.

According to a possible embodiment, the one or more break bulk goods of a lowermost cargo layer are fixed on the bottom layer by means of wedge elements which are arranged on the bottom layer. By fixedly clamping the one or more break bulk goods by means of wedge elements the method provides an improved and simple manner of securing the break bulk goods in the hold. Hereby, they do not shift or move, or do so to only limited extent, during transport thereof.

According to a possible embodiment, at least a lower part of the wedge elements is manufactured from a natural or synthetic polymer material. According to an advantageous embodiment, the polymer material has the same or similar properties as the polymer material which is used for the mats. The friction between the wedge element and the bottom layer is improved hereby, and the wedge elements as well as the break bulk goods secured therewith are hereby held in place in improved manner According to a possible embodiment, the wedge elements have a width dimension greater than 5 cm, more preferably greater than 8 cm, more preferably greater than 10 cm. The width dimension is preferably smaller than 100 cm, preferably smaller than 80 cm, most preferably smaller than 50 cm. The width dimension can be the same as the width of the mat. According to a possible embodiment, the wedge elements have a length dimension greater than 10 cm, more preferably greater than 15 cm, most preferably greater than 20 cm. According to a possible embodiment, the wedge elements have a height greater than 10 cm, more preferably greater than 15 cm, most preferably greater than 20 cm. In an embodiment in which the wedge elements have a lower part manufactured from a polymer material, a height of the lower part, typically a lowermost layer, is preferably greater than 0.3 cm, more preferably greater than 0.4 cm, most preferably greater than 0.6 cm. The height (i.e. the thickness) of this lowermost layer is preferably smaller than 5 cm, more preferably smaller than 3 cm.

According to a possible embodiment, the mats are manufactured from a material with a friction coefficient greater than 0.3, preferably greater than 0.5, most preferably greater than 0.7; wherein the friction coefficient is preferably determined using a tribometer with actuator in accordance with FprEN12195-1. An advantage hereof is based on the insight that material with a higher friction coefficient brings about a higher static friction force. This improves the friction between the mats and an element abutting it, whereby an abutting element is secured or held in place in improved manner.

According to a possible embodiment, the mats are manufactured from a material with a Poisson ratio greater than 0, preferably greater than 0.30, more preferably greater than 0.45; wherein the Poisson ratio is preferably determined by means of an impulse excitation technique. Because the mats are manufactured from a material with a Poisson ratio which is preferably greater than 0.45, the mats retain their volume under a pressure load. The inventiveness hereof lies inter alia in the insight that the mats are subject to a pressure load which depends on the position the mats are in. In the case of for instance steel transport, break bulk goods can have a weight varying between 3 tons and 40 tons. In another example, for instance in the case of heavy weight transports such as for instance transportation of yachts, the break bulk good can have a weight of more than 100 tons. The mats are thus under a high pressure load. It will be apparent that the pressure load in the mats depends on the cargo layer in which the mats are situated. A mat which is for instance situated at the bottom of the hold in a lowermost cargo layer undergoes a load from all the cargo layers situated above the lowermost cargo layer. The method thus provides an improved manner of loading the break bulk goods.

According to a possible embodiment, the mats are manufactured from a material with a mass density, measured at an ambient temperature of 20° C., which is greater than 0.8 g/cm$^3$; preferably greater than 1 g/cm$^3$; most preferably greater than 1.15 g/cm$^3$.

According to a possible embodiment, the mats are manufactured from a material with a hardness greater than 50° Shore A, preferably greater than 60° Shore A, most preferably greater than 69° Shore A, wherein the hardness is preferably measured by instrumented indentation in accordance with ISO 14577.

According to a possible embodiment, the elastically deformable mats have a width dimension greater than 5 cm, more preferably greater than 8 cm, most preferably greater than 10 cm. The width dimension is preferably smaller than 100 cm, more preferably smaller than 80 cm, most preferably smaller than 50 cm.

According to a possible embodiment, the elastically deformable mats have a thickness greater than 0.3 cm, more preferably greater than 0.4 cm, most preferably greater than 0.6 cm. The elastically deformable mats preferably have a thickness smaller than 5 cm, preferably smaller than 3 cm, most preferably smaller than 2.5 cm. An advantage hereof is based on the insight that the mats have a higher mass density than the known materials, such as oak. The advantage hereof is further also based on the insight that loading of the break bulk cargo ship is a substantially manual exercise.

Because the mats have a smaller thickness, the weight of the mats remains limited, whereby they are easier to handle.

According to a possible embodiment, the elastically deformable mats have a length greater than 2 m, preferably greater than 5 m, and preferably lying in a range of 2 m to 10 m, preferably in a range of 5 m to 10 m.

The mats preferably have an upper and underside having a different surface roughness. The surface roughness of the underside is preferably greater than that of the upper side lying against the break bulk goods.

In a possible embodiment the break bulk goods are cylindrical objects such as rolls, and the mats are placed with their longitudinal direction substantially perpendicularly of the axis of the cylindrical objects. The mats can for instance be rolled out in the longitudinal direction, after which the cylindrical objects are directed with their axis perpendicularly of this longitudinal direction.

In a possible embodiment elongate elements can be arranged between successive layers of goods. These elongate elements are preferably substantially manufactured from a natural or synthetic polymer material. The elongate elements can for instance be relatively stiff multi-walled plastic elements. The elongate elements can be provided on their upper and underside with a friction-increasing covering. The elongate elements can be formed from different materials. According to an embodiment, the elongate elements are manufactured from an upper and a lower wall, between which is arranged a core formed in a honeycomb pattern. According to an alternative embodiment, the elongate elements can also be manufactured from a polymer material hardened under pressure, such as a recycled rubber or a polypropylene polymer.

According to a second aspect of the invention, a method is provided for unloading break bulk cargo ships, wherein a cargo layer is stacked in the hold of the break bulk cargo ship, wherein the cargo layer comprises a bottom layer formed by one or more mats and at least one layer of goods, wherein the unloading comprises the following steps of:
  removing the cargo layer from the hold of the break bulk cargo ship;
  recovering the one or more mats.

According to a possible embodiment, the recovering comprises of rolling up the mats.

A third aspect of the invention comprises the use of mats, preferably rolled-up mats for supporting one or more layers of goods and/or cargo layers. The advantages of the method apply mutatis mutandis to the use of the mats.

According to a possible embodiment, the mats are substantially manufactured from a natural or synthetic polymer material.

According to a possible embodiment, the mats are substantially manufactured from rubber.

According to possible embodiment, the rubber comprises a natural rubber.

According to a possible embodiment, the mats are manufactured from a material with a friction coefficient greater than 0.3, preferably greater than 0.5, most preferably greater than 0.7; wherein the friction coefficient is preferably determined using a tribometer with actuator in accordance with F2048FprEN12195-1.

According to a possible embodiment, the mats are manufactured from a material with a Poisson ratio greater than 0, preferably greater than 0.30, more preferably greater than 0.45, most preferably 0.5; wherein the Poisson ratio is determined by means of an impulse excitation technique.

According to a possible embodiment, the mats are manufactured from a material with a mass density, measured at an ambient temperature of 20° C., which is greater than 0.8 g/cm$^3$; preferably greater than 1 g/cm$^3$; most preferably greater than 1.15 g/cm$^3$.

According to a possible embodiment, the mats are manufactured from a material with a hardness greater than 50° Shore A, preferably greater than 60° Shore A, most preferably greater than 69° Shore A, wherein the hardness is measured by instrumented indentation in accordance with ISO 14577.

According to a possible embodiment, the elastically deformable mats have a width dimension greater than 5 cm, preferably greater than 8 cm, more preferably greater than 10 cm.

According to a possible embodiment, the elastically deformable mats have a thickness greater than 0.3 cm, more preferably greater than 0.4 cm, most preferably greater than 0.6 cm.

According to a possible embodiment, the elastically deformable mats have a thickness smaller than 5 cm, preferably smaller than 3 cm, most preferably smaller than 2.5 cm.

According to a possible embodiment, the elastically deformable mats have a length greater than 2 m, preferably greater than 5 m.

BRIEF DESCRIPTION OF THE FIGURES

The above stated and other advantageous features and objects of the invention will become more apparent, and the invention better understood, on the basis of the following detailed description when read in combination with the accompanying drawings, in which:

FIG. 5 is a perspective view of an assembly of different break bulk goods stacked according to an embodiment of the method;

The same or similar elements are designated in the drawing with the same reference numerals.

DETAILED EMBODIMENTS

Figure 1:
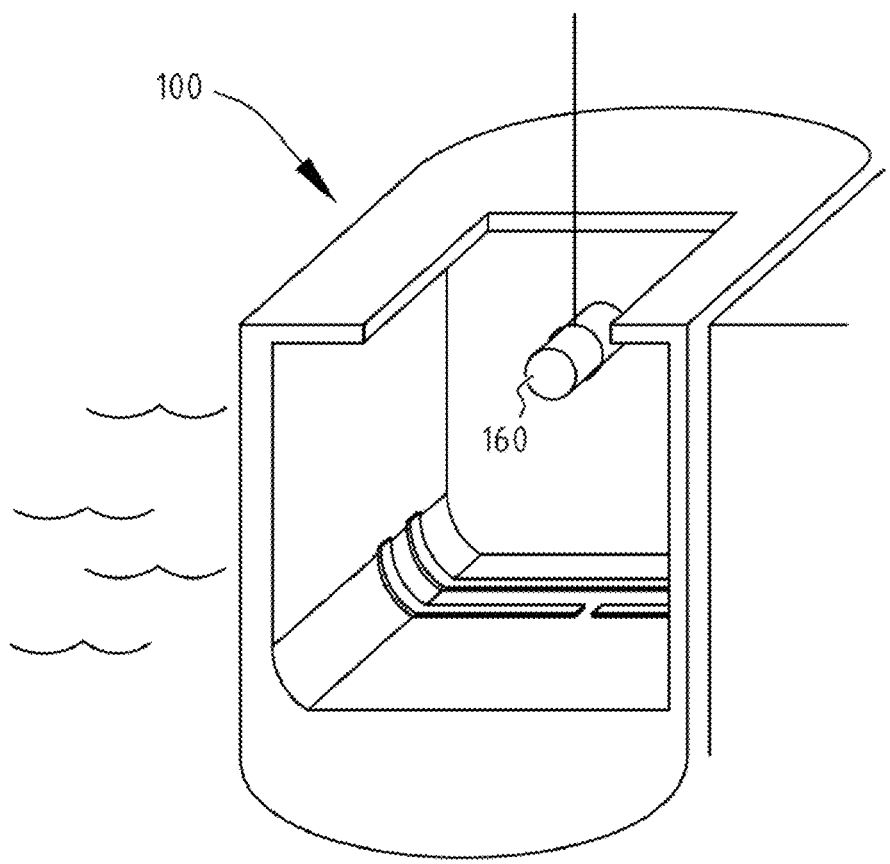
FIG. 1 is a partially cut-away perspective view of a break bulk cargo ship.

The invention will now be further described with reference to exemplary embodiments shown in the drawing.

FIG. 1 illustrates a cross-section of a break bulk cargo ship. The break bulk cargo ship is moored at a quay. The break bulk cargo ship is loaded by stacking one or more cargo layers in a hold of the break bulk cargo ship. The break bulk goods are loaded into the hold, wherein use is typically made of a lifting means, such as a crane. It is noted that the break bulk goods must be in a balanced distribution in the hold for the balance of the break bulk cargo ship.

Figure 2A:
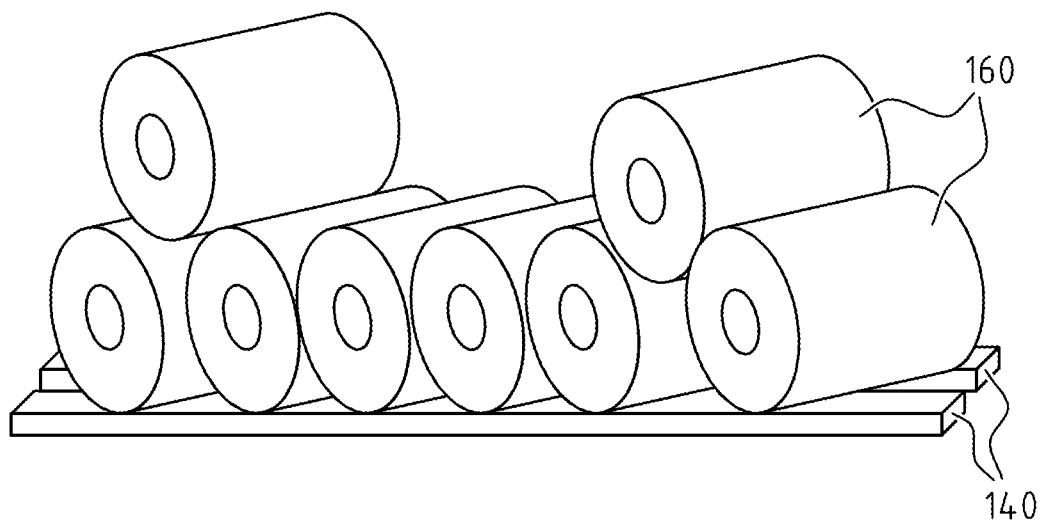
FIGS. 2A and 2B are a perspective view and a front view of break bulk goods stacked according to an embodiment of a method.
Figure 2B:
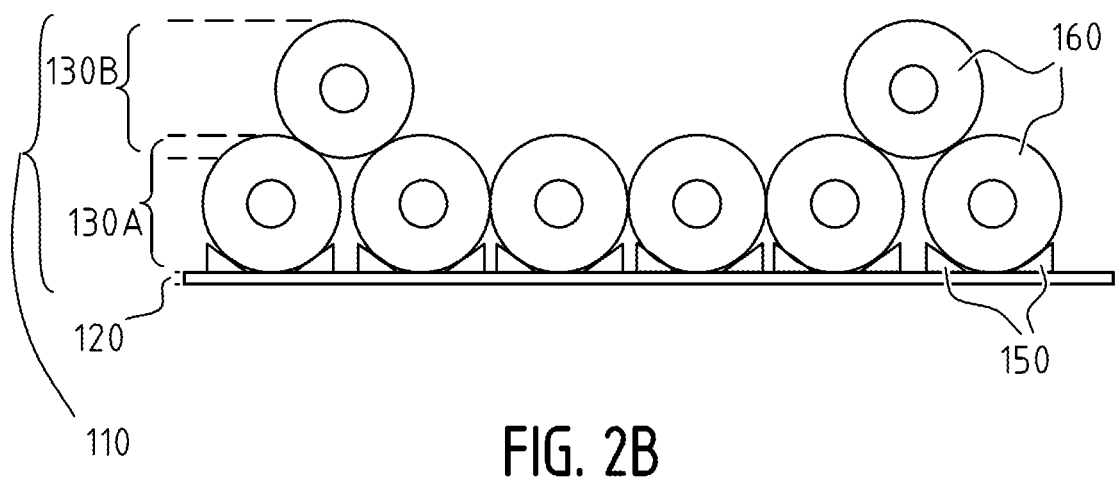

FIGS. 2A and 2B illustrate break bulk goods 160 which are stacked according to an embodiment of the method. Break bulk goods 160 here take the form of elongate rolls, for instance rolls of steel wire or steel plate, but can also be cases, crates, drums, bales, cars and so on. A cargo layer 110 comprises a bottom layer 120 and at least one layer of goods 130A and 130B on bottom layer 120.

Loading of the break bulk cargo ship 100 according to a preferred embodiment of the method comprises of placing the bottom layer 120 for each cargo layer 110. The bottom layer 120 is formed by one or more mats 140 which are manufactured from an elastically deformable material, such as a natural or synthetic polymer. Mats 140 are elongate, such that they extend adjacently of each other when the bottom layer is placed. In a first cargo layer, which is in direct contact with the hold, two mats 140 can for instance be placed adjacently of each other on the bottom of the hold. More or fewer mats can be placed, depending on the load of the break bulk goods which will be placed thereon. The mats are preferably unrolled from a rolled-up position to an unrolled position during placing. In this way the mats can be transported in rolls in simple manner.

After placing of bottom layer 120 at least one layer of goods 130A, 130B is placed on bottom layer 120. A first layer of goods 130A can be placed directly on the bottom layer. When placing the first layer of goods 130A, the break bulk goods 160 can be fixed on the bottom layer by means of wedge elements 150 which are arranged on bottom layer 120. These wedge elements are illustrated further in FIG. 4. In the embodiment illustrated in FIGS. 2A and 2B, wherein break bulk goods and 60 are being loaded, a second layer of goods 130B can be placed on the first layer of goods 130A. An additional advantage hereof is based on the insight that the second layer of goods 130B secures the first layer of goods 130A in a fixed position. This is because the lateral displacement of the rolls 160 is limited by the rolls in the second layer of goods 130B. These rolls 160 in the second layer of goods 130B are referred to as locking rolls.

Figure 3:
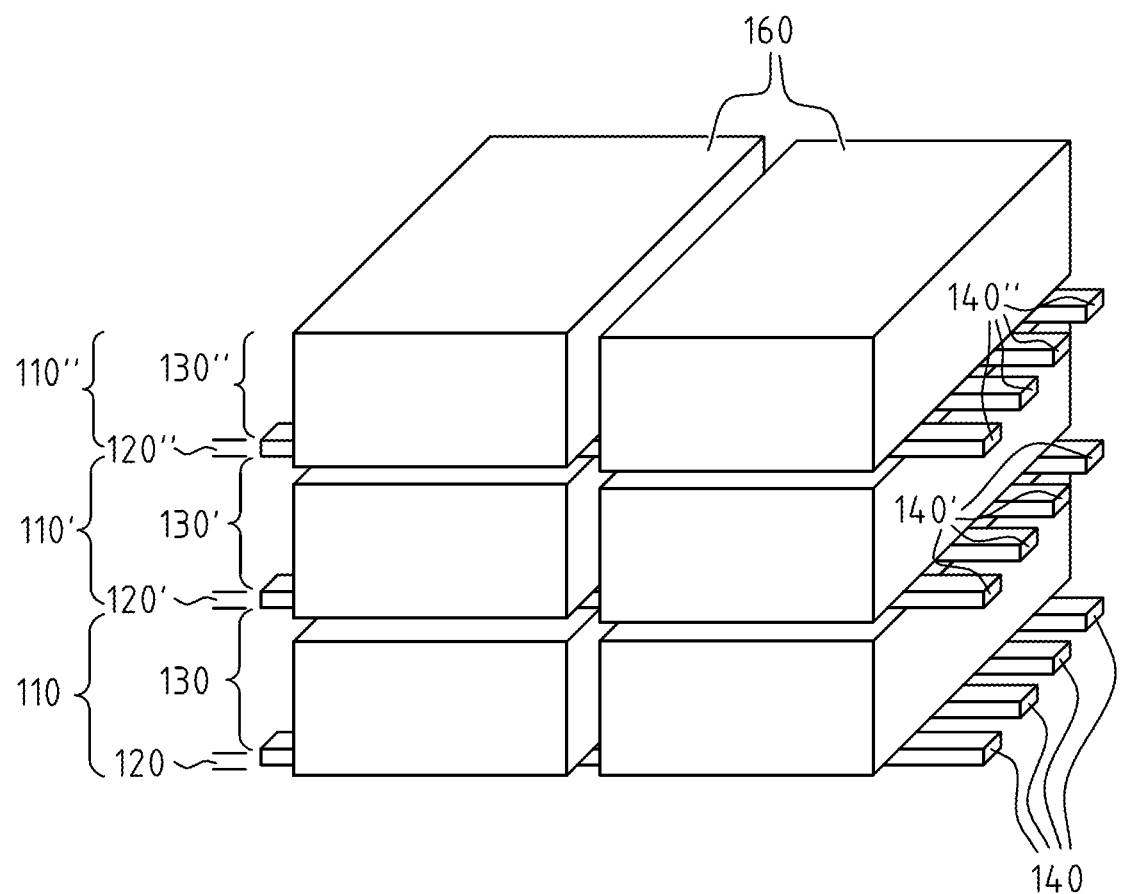
FIG. 3 is a perspective view of alternative break bulk goods stacked according to an embodiment of the method.

FIG. 3 illustrates an alternative embodiment of the method for stacking break bulk goods. In this embodiment the break bulk goods take the form of crates. FIG. 3 illustrates particularly a plurality of columns with several cargo layers 110, 110', 110" stacked one on the other. The different cargo layers 110, 110', 110" are stacked successively, particularly, the first cargo layer 110 is placed and then, in succession, cargo layers 110' and 110". Each of the cargo layers 110, 110', 110" comprises a bottom layer 120, 120', 120" and at least one layer of goods 130, 130', 130". Bottom layers 120, 120', 120" are in this embodiment in each case formed from four mats 140, 140', 140", these mats being manufactured from an elastically deformable material. Bottom layers 120, 120', 120" can extend over a plurality of columns, for instance over two columns of break bulk goods. It is preferred for the bottom layers to extend transversely of the longitudinal direction of the break bulk cargo ship. An improved support is hereby obtained. The bottom layers can optionally also extend parallel to the longitudinal direction of the break bulk cargo ship.

Figure 4:
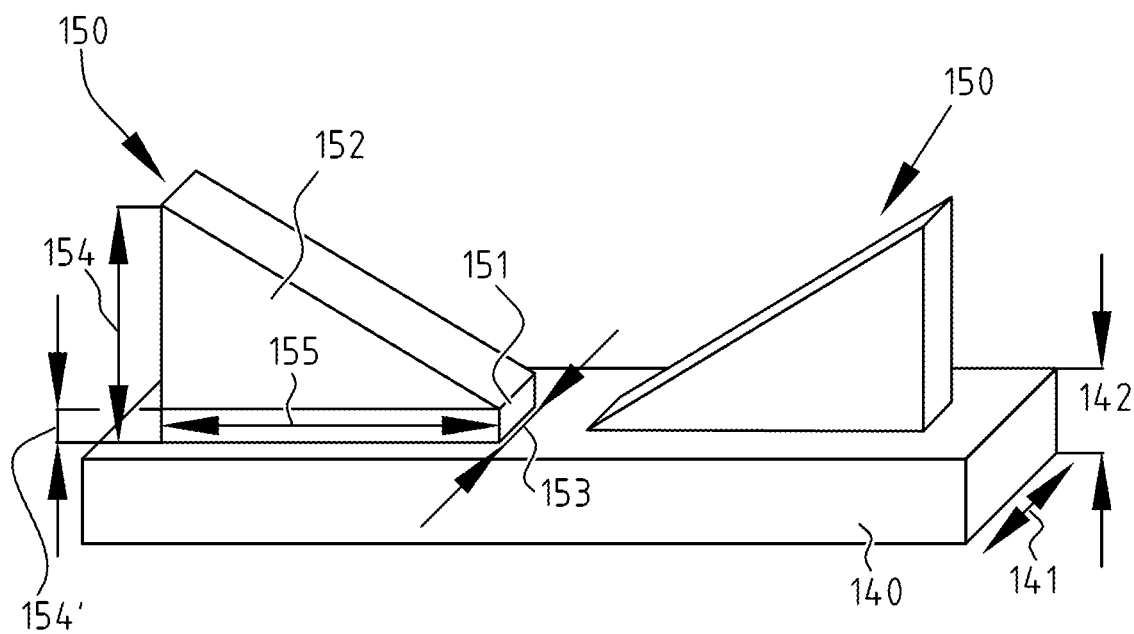
FIG. 4 is a perspective view of embodiments of the wedge elements.

FIG. 4 illustrates a part of the mats 140 and the wedge elements 150. Mats 140 are manufactured from an elastically deformable material, such as a natural or synthetic polymer. Mats 140 are preferably manufactured from the material with a friction coefficient greater than 0.3, more preferably greater than 0.5, most preferably greater than 0.7. The friction coefficient is understood to mean the static friction coefficient. The friction coefficient is a dimensionless number that indicates the degree of friction between two surfaces. The static friction coefficient is the ratio between a maximum occurring friction force and a normal force before the surfaces begin moving relative to each other, for instance the upper surface of mats 140 and the surface of a break bulk good 160 which is in contact therewith. The friction coefficient can be determined using one of a friction angle method, a mass ratio method, a spring scale method, a pendulum method or tribometer with actuator (not shown). The friction coefficient is preferably determined using a tribometer with actuator in accordance with F2048FprEN12195-1.

Mats 140 are preferably manufactured from the material with a Poisson ratio greater than 0, more preferably greater than 0.30, most preferably greater than 0.45. The mats are manufactured from the material with a Poisson ratio equal to 0.5. The Poisson ratio is a constant describing the effect of the extension on the expansion in the direction perpendicularly of the direction of compression. In the context of the application, expansion in the direction perpendicularly of the direction of compression is the reaction of the material from which the mats are manufactured to a tensile or pressure load. When a break bulk good 160 is for instance placed on a mat 140, the mat in compressed in a determined direction, particularly a vertical direction. Mat 140 then tends to expand in the other two directions, particularly in the longitudinal direction and the width direction. A Poisson ratio equal to 0.5 indicates a retention of volume. This means that the volume is constant when a pressure load is exerted. It is noted that this does not relate to necking of the material, wherein it only becomes thinner locally. The Poisson ratio is determined by means of an impulse excitation technique.

Mats 140 are preferably manufactured from a polymer. The polymer is preferably a natural or synthetic polymer. The polymer is preferably a rubber, wherein the rubber preferably comprises natural rubber.

FIG. 4 further illustrates that mats 140 have a width dimension 141 greater than 5 cm, more preferably greater than 8 cm, most preferably greater than 10 cm. Mats 140 further preferably have a height 142 greater than 0.3 cm, more preferably greater than 0.4 cm, most preferably greater than 0.6 cm. The inventiveness hereof is based on the insight that the mats are typically placed in the hold manually. Mats 140 must thus have a good balance between the weight and a length dimension thereof, such that they are manually placeable. Mats 140 have a length which is at least ten times greater than a width thereof, preferably at least thirty times greater than the width, most preferably at least fifty times greater than the width. Mats 140 can for instance have a length dimension (not shown) greater than 1 m, more preferably greater than 3 m, most preferably greater than 5 m. It is possible for the mats 140 to be rolled up when not in use, such that if the mats are to be reused they can be rolled up during unloading and be unrolled when a break bulk cargo ship is loaded again.

FIG. 4 further illustrates the wedge elements 150 with which the one or more break bulk goods 160 of a lowermost cargo layer are fixed on the bottom layer, particularly the mat 140. Wedge elements 150 take a triangular form. It will further be apparent to the skilled person that several forms are possible. Wedge elements 150 thus take the form of a right triangle, but a random triangle (not shown), for instance an obtuse triangle, is also possible. Wedge elements 150 can be manufactured, at least at a lower part 151 thereof, from the same material as the bottom layer 120 of cargo layer 110. In this embodiment an upper part can be manufactured from for instance wood. Wedge elements 150 can optionally also be manufactured wholly from the same material as the bottom layer 120 of the cargo layer, wedge elements 150 can for instance be manufactured integrally from one polymer. A width dimension 153 of wedge elements 150 is preferably greater than 5 cm, more preferably greater than 8 cm, more preferably greater than 10 cm, most preferably the same as the width dimension 141 of mat 140. A length dimension 155 of wedge elements 150 is preferably greater than 10 cm, more preferably greater than 15 cm, most preferably greater than 20 cm. A height 154 of wedge elements 150 is preferably greater than 10 cm, more preferably greater than 15 cm, most preferably greater than 20 cm. In an embodiment in which wedge elements 150 have a lower part 151 which is manufactured from the same material as the bottom layer a height 154' thereof is preferably greater than 0.3 cm, more preferably greater than 0.4 cm, most preferably greater than 0.6 cm. The width dimension and a length dimension of the lower part of wedge element 150 preferably correspond to the width dimension and the length dimension of a wedge element which is manufactured from one material. Wedge elements 150 are arranged on the bottom layer 120 after this layer has been placed. Wedge elements 150 are arranged such that they fix break bulk goods 160. The distance at which they are arranged is determined by dimensions of the break bulk goods 160.

FIG. 5 further illustrates a full hold of a break bulk cargo ship, wherein different rows and different columns with different break bulk goods are stacked according to an embodiment of the method. A row of steel rolls is for instance illustrated, for which a plurality of bottom layers 120, 120', 120" are placed parallel to each other in longitudinal direction. These bottom layers 120, 120', 120" can overlap each other or can be placed offset, such that a continuous bottom layer 120, 120', 120" is formed. Break bulk goods 160 can subsequently be placed on the continuous bottom layer 120, 120', 120".

Figure 6A:
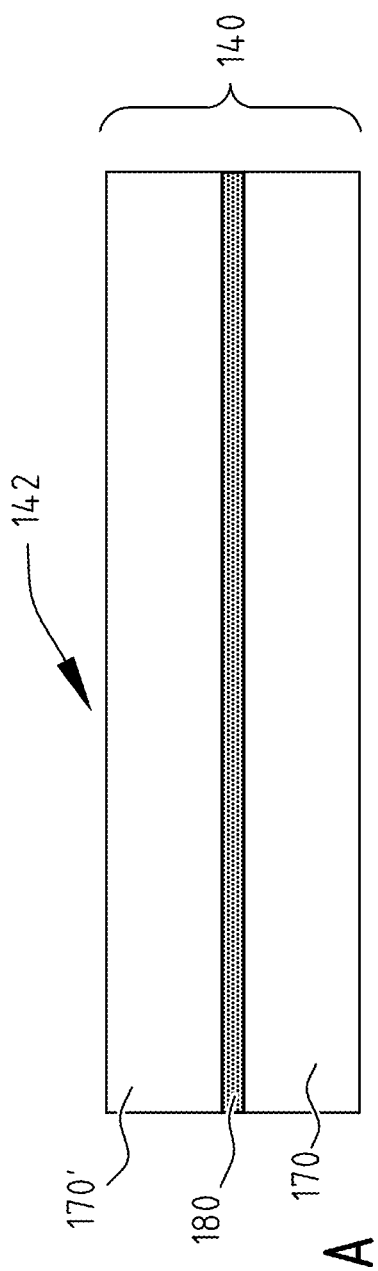
FIG. 6A is a cross-section of a multi-layer mat according to an embodiment of the method.
Figure 6B:
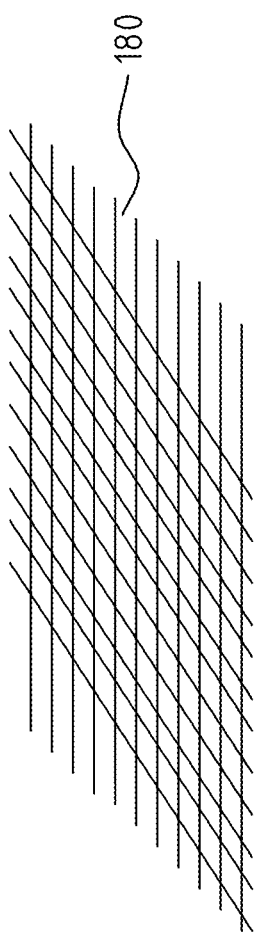
FIG. 6B is a perspective view of a fibre cloth according to an embodiment of the method.
Figure 6C:
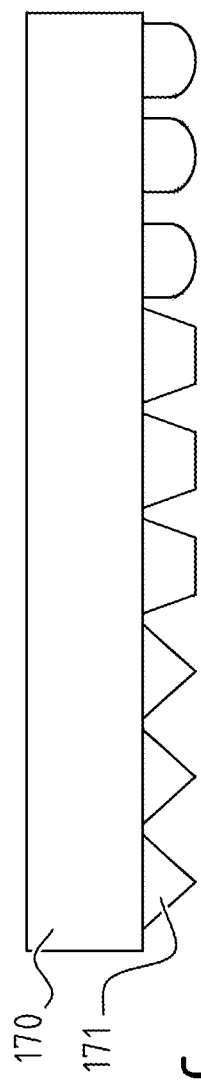
FIG. 6C is a cross-section of a mat according to an embodiment of the method.

FIGS. 6A, 6B and 6C illustrate further embodiments of the mats 140. FIG. 6A illustrates particularly a cross-section of a mat 140 manufactured from a plurality of layers 170, 170', 180, particularly at least two polymer layers 170, 170' and at least one fibre cloth layer 180. In this figure mat 140 is illustrated as an assembly of two polymer layers 170, 170' between which a fibre cloth layer 180 is attached. The fibre cloth layer 180 is attached on an upper and underside thereof to a polymer layer 170, 170'. Fibre cloth layer 180 functions as a reinforcement for the polymer layers. In other words, the fibre cloth layer realizes a reinforcement, particularly in respect of absorbing potential tensile forces. The expansion in the direction perpendicularly of the direction of compression of mat 140 is thus improved. A plurality of fibre cloth layers can optionally be provided in a mat 140. It is recommended for a fibre cloth layer to be adhered on the upper and underside thereof to a polymer layer in each case, such that the layered structure of a mat with a plurality of layers alternates between a polymer layer and a fibre cloth layer. A polymer layer is preferably in each case situated on an upper side 141 and underside 142 of the mat 140.

FIG. 6B illustrates a fibre cloth layer. The fibre cloth layer can be a woven or a non-woven material.

FIG. 6C illustrates a polymer layer 170 of a mat 140, an underside and/or upper side of which can comprise an uneven structure for the purpose of obtaining an increased surface roughness. The uneven structure is preferably provided on the underside of the lowermost polymer layer 170 of mat 140, illustrated in FIG. 6A. The uneven structure can be formed by a pattern of protrusions. These can optionally be pyramidal, truncated pyramidal or round protrusions. The uneven structure is preferably arranged on the surface of mat 140 which is in contact with the hold. The advantage hereof is based on the insight that the cargo hold is typically formed from metal and has a relatively low friction coefficient. The uneven structure improves the friction between a floor of the cargo hold and the mat 140. The break bulk goods are hereby fixed in the hold in improved manner.

Although not illustrated, the application also relates to a method for unloading a break bulk cargo ship, wherein the method comprises of removing one or more cargo layers 110 from the hold of the break bulk cargo ship. The removal comprises of successively removing at least a break bulk good 160 of a layer of goods 130, 130', 130" which is formed by one or more layers of break bulk goods 160 in a cargo layer 110, 110', 110". In the embodiment illustrated in FIG. 5 the break bulk good 160 of the layer of goods can be removed from cargo layer 110" first. When break bulk good 160 has been removed, the bottom layer 120 of cargo layer 110" can be recovered. The mats forming bottom layer 120 can be rolled up during removal, such that they can be transported and reused in simple manner when a subsequent break bulk cargo ship is loaded as according to the method of the invention. The invention thus provides a way of loading and unloading a break bulk cargo ship in a renewable manner, particularly by reusing the bottom layer.

The skilled person will appreciate on the basis of the above description that the invention can be embodied in different ways and on the basis of different principles. The invention is not limited here to the above described embodiments.

The above described embodiments and the figures are purely illustrative and serve only to increase understanding of the invention. The invention is not therefore limited to the embodiments described herein, but is defined in the claims.

The invention claimed is:

1. A method for loading break bulk cargo ships, wherein the method comprises stacking one or more cargo layers in a hold of the break bulk cargo ship, wherein the stacking comprises:
   placing a bottom layer for each cargo layer, wherein the bottom layer is formed by one or more mats which are manufactured from an elastically deformable material, such that the one or more mats form strips which extend adjacently of each other in an elongate manner, wherein the placing comprises supplying the one or more mats in a rolled-up state, and unrolling the one or more mats; and
   placing at least one layer of goods on the bottom layer, wherein the at least one layer of goods is formed by one or more layers of break bulk goods comprising a plurality of steel rolls or steel coils.

2. The method according to claim 1, wherein the one or more mats comprise a layer of natural or synthetic polymer material.

3. The method according to claim 2, wherein the polymer material comprises rubber.

4. The method according to claim 3, wherein the rubber comprises a natural rubber.

5. The method according to claim 1, wherein each mat of the one or more mats comprises a plurality of layers, comprising at least one polymer layer which is formed from the elastically deformable material and at least one fibre cloth layer which is attached to the at least one polymer layer.

6. The method according to claim 1, wherein the one or more break bulk goods of a lowermost cargo layer are fixed on the bottom layer by means of wedge elements which are arranged on the bottom layer.

7. The method according to claim 6, wherein at least a lower part of the wedge elements is manufactured from a natural or synthetic polymer material.

8. The method according to claim 1, wherein the one or more mats are manufactured from a material with a friction coefficient greater than 0.3; and wherein the friction coefficient is determined using a tribometer with actuator in accordance with F2048FprEN12195-1.

9. The method according to claim 1, wherein the one or more mats are manufactured from a material with a Poisson ratio greater than 0; and wherein the Poisson ratio is determined by means of an impulse excitation technique.

10. The method according to claim 1, wherein the one or more mats are manufactured from a material with a mass density, measured at an ambient temperature of 20° C., greater than 0.8 g/cm$^3$.

11. The method according to claim 1, wherein the one or more mats are manufactured from a material with a hardness greater than 50° Shore A, and wherein the hardness is measured by instrumented indentation in accordance with ISO 14577.

12. The method according to claim 1, wherein the one or more mats have a width dimension greater than 5 cm.

13. The method according to claim 1, wherein the one or more mats have a thickness greater than 0.3 cm.

14. The method according to claim 13, wherein the one or more mats have a thickness smaller than 5 cm.

15. The method according to claim 1, wherein the one or more mats have a length greater than 2 m.

16. A method for unloading a break bulk cargo ship, wherein a cargo layer is stacked in a hold of the break bulk cargo ship, wherein the cargo layer comprises a bottom layer formed by one or more mats and at least one layer of goods comprising a plurality of steel rolls or steel coils, and wherein the unloading comprises:
   removing the at least one layer of goods from the hold of the break bulk cargo ship; and
   recovering the one or more mats, wherein the recovering comprises rolling up the one or more mats such that the one or mats can be reused.

* * * * *